July 19, 1927.

E. L. SCHUMACHER 1,636,443

GOGGLES

Filed Feb. 11, 1925

INVENTOR
Elmer L. Schumacher.
BY
Harry H. Styll
ATTORNEY

Patented July 19, 1927.

1,636,443

UNITED STATES PATENT OFFICE.

ELMER L. SCHUMACHER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

GOGGLES.

Application filed February 11, 1925. Serial No. 8,447.

This invention relates to new and useful improvements in goggles, and has particular reference to improved means for holding lenses in the eye cups of goggles.

An important object of this invention is to provide an eye cup for goggles, strengthened by means of a metallic band, and provided with means for resiliently clamping a lens or a plurality of lenses therein.

Another important object of this invention is to provide means whereby the eye cup of a goggle will be interiorly ventilated and constructed so as to prevent the admission of dirt or dangerous rays of light into the eye.

Still another object of this invention is to provide lens clamping means for the eye cups of goggles which shall be positive in operation, cheap to manufacture, and of such simple structure that the lenses may be inserted or removed with a minimum of trouble.

Other objects and advantages of the invention, together with various details of construction, will become readily apparent during the course of the following description taken in connection with the accompanying drawings, wherein like numerals are used to designate corresponding parts throughout all the views of the same, and in which.

In the commercial use of goggles, whether it be in factory or individual use, there has constantly been a demand for a goggle in which the eye cups are provided with means for removably securing lenses. This need has arisen from the fact that some manufacturers desire to replace the lenses usually purchased in goggles with lenses having certain properties particularly applicable for their industries, or else the manufacturers have desired to have the lenses removable, due to the fact that frequently the original lenses of the goggles become broken or marred by flying chips, or the like, and must needs be replaced by new lenses. In the individual use of goggles there is often a desire on the part of the user to insert a lens into the goggles which shall retard certain rays of light, as for example in night driving, to cut down the glare of approaching automobile lights, or at other times the user desires to replace the original lenses obtained in the goggles by lenses ground to a prescription to correct his vision.

Prior to my invention, therefore, there have constantly been attempts to provide eye cups in which lenses could be removably clamped, such that there is today a number of goggles constructed with this aim in view. In so far as I am aware, however, practically all of the structures embodied in goggles in use in the present day include either complicated means for retaining the lenses, or else clamping means which are substantially insecure and which frequently permit of the dropping and subsequent breaking of the lenses.

It, therefore, becomes a most important object of my invention to provide a simple, economical and efficient means for clamping lenses in the eye cups of goggles, said means to be positive in their operation and to firmly secure the lenses from displacement or loss.

Figure 1:
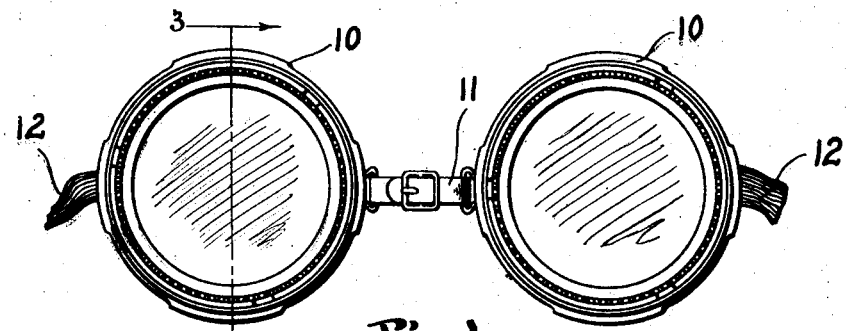
Figure 1 is a front elevation of a pair of goggles constructed in accordance with my invention.
Figure 2:
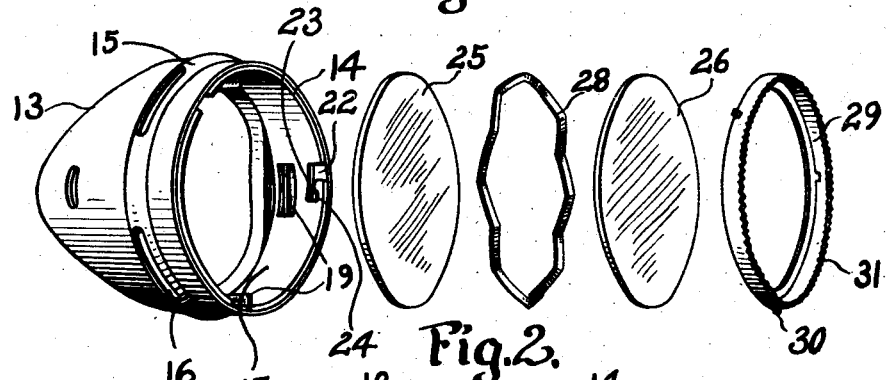
Figure 2 is a perspective view of one of the eye cups, the same having its component parts in spaced relation to each other to more clearly illustrate their method of assembly.

Referring now then particularly to the drawing, wherein I have shown the preferred embodiment of my invention, the numeral 10 designates a pair of eye cups being joined by means of a suitable nose piece 11, and being further provided with suitable temples 12. The eye cups 10 of my goggles comprise substantially cylindrical composition members having one edge curved as at 13 to conform to the contour of the face of the wearer, and having the opposite edge flat as at 14 for the reception of a lens. Formed in the wall of the eye cup 10 and adjacent but spaced from the edge 14 is a hollow bead 15 provided with the ventilating openings 16, as clearly illustrated in Figure 2 of the drawing.

Rigidly clamped interiorly of the eye cup 10 is an annular reinforcing band 17, the same being positioned relative to the hollow bead 15, such that an annular peripheral air chamber 18 is formed intermediate this bead and the band. At certain predetermined points in the reinforcing band 17, and preferably in staggered relation to the ventilating openings 16 formed in the hollow bead 15, I have formed and struck inwardly the projections 19, whereby a plurality of ventilating openings 20 are formed in the reinforcing band 17, thus permitting the free circulation of air from the exterior of the goggle to the interior thereof.

Adjacent the outer edge of the reinforcing band 17, I have provided a plurality of bayonet slots 21, the same comprising a mouth 22, a sloping base 23, and a recess 24 for the reception of a locking pin engaged therewith. From the particular construction of this bayonet slot, it may clearly be seen that a pin forced into the mouth 22 is cammed by the base 23 and may be eventually seated and locked in the recess or catch portion 24.

Figure 3:
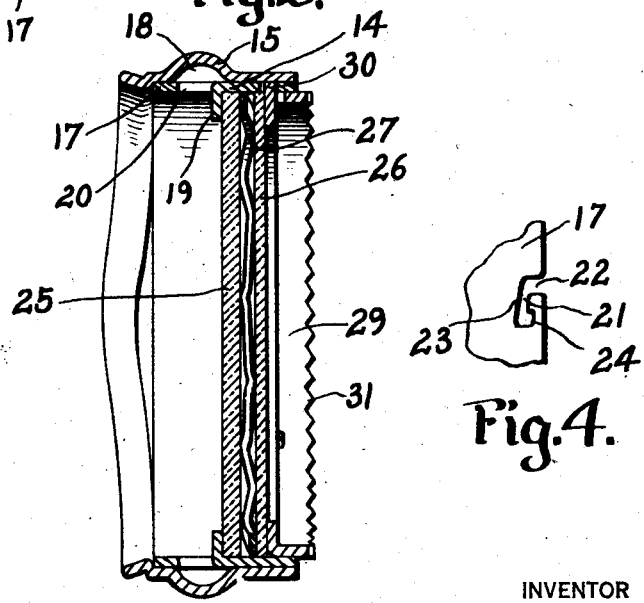
Figure 3 is a transverse sectional view taken on line 3—3 of Figure 1.
Figure 4:
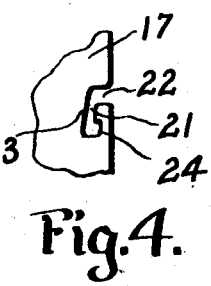
Figure 4 is a detail sectional view of the bayonet slot forming a part of this invention.

In Figure 3 of the drawing, I have shown seated on the projections 19 a lens 25, which in this particular illustration I prefer to consider as a lens having certain specific qualities either of refraction or reflection. Mounted forwardly of the lens 25 is a protective lens 26 adapted to guard the lens 25 and prolong the life of the same. Mounted intermediate the lens 25 and guard lens 26, and spacing the same from each other, is a resilient annular washer 27 bent into a plurality of displaced portions 28, as clearly illustrated in Figures 2 and 3 of the drawing. It may clearly be seen that with a washer constructed as illustrated the lens 26 will be well spaced from the lens 25, and yet will be capable of movement to or away from the lens 25, and a cushion effect obtained.

Mounted forwardly of the lens 26, and adapted to bear thereagainst is an annular clamping ring 29 provided with the outwardly struck projections 30 and the serrated gripping edge 31. This clamping ring is substantially L-shaped in cross section, as clearly shown in Figure 3 of the drawing, and is adapted to be pressed inwardly against the face of the lens 26 and locked in this clamped position by means of the projections 30 clamping in the bayonet slots 21.

In the use of my improved goggle it may clearly be seen that lenses may be clamped in the eye cups of the same with little or no difficulty. In assembling the completed eye cup, as shown in Figure 3, a lens, such as 25, is placed in the eye cup from the outer edge 14, and is seated upon the projections 19. After the lens 25 has thus been seated on the projections 19, the resilient washer 27 is placed adjacent its outer surface and the protective lens 26 inserted. In order, then, to clamp these lenses and prevent the same from being displaced, it is only necessary to insert the annular ring 29 into the eye cup, with the projections 30 entering the mouths 22 of the bayonet slots 21. If, then, the annular ring be pressed directly inwardly, the projections 30 will contact with and ride upon the sloping base 23, at which time the ring 29 may be turned and the projections 30 snapped into the recesses 24. It is obvious that the spring washer 27 will tend to hold the projections 30 in the recesses 24 and permit of the removal of the same only by the application of pressure to the annular ring 29.

It will thus be seen that I have provided an eye cup in which lenses may be removably clamped, and yet in which the accidental displacement or loosening of the lenses is entirely eliminated. It will further be seen that I have provided an eye cup into which lenses may be clamped by anyone, regardless of whether or not he is familiar with ophthalmic mounting or work of this character, and which will, therefore, be capable of use by laborers of any class under any and all conditions.

It will further be seen that I have provided lens clamping means which are simple in construction, will, therefore, be cheap to manufacture, and yet which are adapted in every way to the purposes specified.

Although I have shown and described, a specific form of my invention, which I desire to consider as the preferred embodiment of the same, it is to be expected in the practical manufacture and use of the same that various changes will suggest themselves, so that I reserve the right to make these changes, in so far, as I remain within the spirit of my invention and the scope of the appended claims.

I claim:

1. An eye cup, a perforated hollow bead formed in the wall thereof, a perforated reinforcing band mounted interiorly of the eye cup and forming with the hollow bead a peripheral air chamber, the perforations in the reinforcing band being in staggered relation to the perforations in the hollow bead, and the material cut away to form the perforations in the reinforcing band being bent laterally into the cup to form a lens seat.

2. In an eye cup, a perforated hollow bead formed in the wall thereof, a reinforcing band mounted interiorly of the eye cup and forming a peripheral air chamber with the hollow bead, projections struck from the reinforcing band to form a lens seat, the openings from which said projections were struck up being in staggered relation to the perforations in the hollow bead.

3. In a device of the character described, a cylindrical lens rim having a cupped ring near its outer edge, said ring having a plurality of apertures and an annular ring in the lens rim having a portion overlying the cupped ring and having a plurality of cut out portions in line with the cupped ring, the material of the cut out portions being bent laterally into the lens rim to form lens seats, the said cut out portions and the apertures in the ring forming vents to the interior of the lens rim.

4. In a device of the character described, a cylindrical lens rim having a cupped ring near its outer edge, said ring having a plurality of apertures, and an annular ring in the lens rim having a portion overlying the cupped ring and having a plurality of cut out portions in line with the cupped ring, said cut out portions and the apertures in the ring forming vents to the interior of the lens rim.

5. In a device of the character described, a cylindrical lens rim having a cupped ring near its outer edge, said ring having a plurality of apertures, and an annular ring in the lens rim having a portion overlying the cupped ring and having a plurality of cut out portions in line with the cupped ring, the said cut out portions and the apertures in the ring being staggered in relation to each other and forming vents to the interior of the lens rim.

ELMER L. SCHUMACHER.